United States Patent
Muthiah

(10) Patent No.: US 11,562,018 B2
(45) Date of Patent: Jan. 24, 2023

(54) STORAGE SYSTEM AND METHOD FOR OPTIMIZED SURVEILLANCE SEARCH

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 273 days.

(21) Appl. No.: 16/781,717

(22) Filed: Feb. 4, 2020

(65) Prior Publication Data

US 2021/0240764 A1   Aug. 5, 2021

(51) Int. Cl.
G06F 16/735   (2019.01)
G06N 20/00   (2019.01)
G06N 5/04   (2006.01)

(52) U.S. Cl.
CPC ............. G06F 16/735 (2019.01); G06N 5/04 (2013.01); G06N 20/00 (2019.01)

(58) Field of Classification Search
CPC ..... G06F 16/735; G06F 16/7837; G06N 5/04; G06N 20/00
See application file for complete search history.

(56) References Cited

U.S. PATENT DOCUMENTS

| | | | |
|---|---|---|---|
| 5,099,150 A | 3/1992 | Steele | |
| 6,002,802 A | 12/1999 | Chujoh | |
| 6,542,075 B2 | 4/2003 | Barker et al. | |
| 6,768,661 B2 | 7/2004 | Vyvoda et al. | |
| 7,631,327 B2 | 12/2009 | Dempski et al. | |
| 7,760,230 B2 | 7/2010 | Russell et al. | |
| 7,847,820 B2 | 12/2010 | Vallone et al. | |
| 8,412,783 B2 | 4/2013 | Boston et al. | |
| 8,516,019 B2 | 8/2013 | Hunt et al. | |
| 8,676,027 B2 | 3/2014 | Hugosson | |
| 8,725,940 B2 | 5/2014 | Grube et al. | |
| 8,825,721 B2 | 9/2014 | Hunt et al. | |
| 9,037,921 B1 | 5/2015 | Brooker et al. | |
| 9,215,423 B2 | 12/2015 | Kimble et al. | |
| 9,414,109 B2 | 8/2016 | Cheng et al. | |
| 9,489,580 B2 | 11/2016 | Laska et al. | |

(Continued)

FOREIGN PATENT DOCUMENTS

| | | |
|---|---|---|
| EP | 1173020 A2 | 1/2002 |
| EP | 1173020 A3 | 7/2002 |

(Continued)

OTHER PUBLICATIONS

International Search Report dated Aug. 26, 2020 for International Application No. PCT/US2020/024852.

(Continued)

*Primary Examiner* — Cam Y T Truong
(74) *Attorney, Agent, or Firm* — Crowell & Moring LLP

(57) ABSTRACT

A storage system and method for optimized surveillance search are provided. In one embodiment, a storage system is provided comprising a memory and a controller. The controller is configured to: receive, from a host, an image of an object and a logical block address range of video data stored in the memory; search for the image of the object in video data in the logical block address range; and provide the host with possible hits from the search. Other embodiments are provided.

20 Claims, 5 Drawing Sheets

(56) References Cited

U.S. PATENT DOCUMENTS

| | | | |
|---|---|---|---|
| 9,781,479 | B2 | 10/2017 | Klappert et al. |
| 9,836,248 | B2 | 12/2017 | Zhang et al. |
| 10,007,442 | B2 | 6/2018 | Hahn et al. |
| 10,095,445 | B2 | 10/2018 | De et al. |
| 10,228,854 | B2 | 3/2019 | Romanovsky et al. |
| 2001/0044856 | A1 | 11/2001 | Agesen et al. |
| 2003/0093801 | A1 | 5/2003 | Lin |
| 2003/0225746 | A1 | 12/2003 | Braun |
| 2006/0190419 | A1 | 8/2006 | Bunn et al. |
| 2008/0310736 | A1 | 12/2008 | Chattopadhyay |
| 2009/0319255 | A1 | 12/2009 | Vengerov |
| 2010/0074594 | A1* | 3/2010 | Nakamura ............ H04N 13/156 386/241 |
| 2010/0272411 | A1 | 10/2010 | Shiitani et al. |
| 2010/0284612 | A1 | 11/2010 | Peters |
| 2011/0258375 | A1 | 10/2011 | Khosrowpour |
| 2012/0082209 | A1* | 4/2012 | Li ........................ H04N 19/176 375/E7.126 |
| 2012/0102297 | A1 | 4/2012 | Haines |
| 2012/0210232 | A1* | 8/2012 | Wang ................... H04N 19/117 715/723 |
| 2013/0254611 | A1 | 9/2013 | Amerga et al. |
| 2014/0075096 | A1 | 3/2014 | Tanaka |
| 2015/0012671 | A1 | 1/2015 | Park et al. |
| 2015/0237351 | A1 | 8/2015 | Lee et al. |
| 2015/0261452 | A1 | 9/2015 | Moon |
| 2016/0211003 | A1 | 7/2016 | Chen et al. |
| 2016/0345009 | A1 | 11/2016 | Zhong et al. |
| 2017/0285949 | A1 | 10/2017 | Trika et al. |
| 2017/0285968 | A1 | 10/2017 | Jung et al. |
| 2018/0068540 | A1 | 3/2018 | Romanenko |
| 2018/0189635 | A1 | 7/2018 | Olarig et al. |
| 2018/0267720 | A1 | 9/2018 | Goldberg |
| 2018/0270499 | A1 | 9/2018 | Symes |
| 2018/0295367 | A1 | 10/2018 | Mohhamed et al. |
| 2018/0341410 | A1 | 11/2018 | Benisty |
| 2018/0357074 | A1* | 12/2018 | Sharoni ................... G06V 20/41 |
| 2019/0043201 | A1 | 2/2019 | Strong |
| 2019/0079677 | A1 | 3/2019 | Malladi et al. |
| 2019/0104341 | A1 | 4/2019 | Catalano et al. |
| 2019/0163622 | A1 | 5/2019 | Wu et al. |
| 2019/0187936 | A1 | 6/2019 | Naing et al. |
| 2019/0243754 | A1 | 8/2019 | Yu et al. |
| 2019/0246130 | A1 | 8/2019 | Sheikh |
| 2019/0294730 | A1 | 9/2019 | Jenkins et al. |
| 2019/0313083 | A1* | 10/2019 | Chavez ............... G06F 16/9538 |
| 2019/0379926 | A1 | 12/2019 | Vari |
| 2020/0145701 | A1 | 5/2020 | Liu |
| 2021/0149946 | A1* | 5/2021 | VanBlon ............ G06V 10/235 |
| 2021/0385532 | A1* | 12/2021 | Michiels .......... H04N 21/44008 |

FOREIGN PATENT DOCUMENTS

| | | |
|---|---|---|
| EP | 2 141 928 A1 | 1/2010 |
| JP | 2010-161740 A | 7/2010 |
| KR | 10-2018-0015101 A | 10/2018 |
| KR | 10-2018-0114972 A | 10/2018 |
| WO | WO2015/154549 A1 | 10/2015 |
| WO | WO 2017/134110 A1 | 8/2017 |

OTHER PUBLICATIONS

Written Opinion dated Aug. 26, 2020 for International Application No. PCT/US2020/024852.
Office Action in U.S. Appl. No. 16/781,688, dated Apr. 2, 2021, 26 pages.
XuanHua Shi et al., "Deca: A Garbage Collection Optimizer for In-Memory Data Processing", <https://di.acm.org/doi/full Html/10.1145/3310361>, ACM Trans. Comput. Syst., vol. 36, No. 1, Article 3, Publication date: Mar. 2019. DOI: https://doi.org/10.1145/3310361 (Year: 2019), 66 pages.
Non-final Office Action dated Aug. 12, 2021 for U.S. Appl. No. 16/818,452.
U.S. Appl. No. 16/708,091, filed Dec. 2019, Muthiah et al.
U.S. Appl. No. 16/818,452, filed Mar. 2020, Muthiah et al.
U.S. Appl. No. 15/929,090, filed Jan. 2019, Muthiah et al.
U.S. Appl. No. 16/670,112, filed Oct. 2019, Muthiah et al.
European Search Report in EP Application No. 19216071.1, dated Feb. 7, 2020, 8 pages.
U.S. Appl. No. 16/781,717, filed Feb. 4, 2020 entitled "Storage System and Method for Optimized Surveillance Search."
"Trick mode"; Wikipedia entry; downloaded from the Internet at https://en.wikipedia.org/wiki/Trick_mode on Jul. 22, 2019; 1 page.
"MPEG transport stream"; Wikipedia entry; downloaded from the Internet at https://en.wikipedia.org/wiki/MPEG_transport_stream on Jul. 22, 2019; 6 pages.
Singh, S. et al.; "Real-Time Implementation of Change Detection for Automated Video Surveillance System"; Research article; ISRN Electronics, vol. 2013, Article ID 691930; 5 pages; Jun. 11, 2013.
Office Action in U.S. Appl. No. 15/929,090, dated Feb. 20, 2020, 17 pages.
Office Action in U.S. Appl. No. 15/929,090, dated Sep. 27, 2019, 16 pages.
International Search Report dated Aug. 5, 2020 for International Application No. PCT/US2020/037897.
Written Opinion dated Aug. 5, 2020 for International Application No. PCT/US2020/037897.
Final Office Action dated Jul. 13, 2021 for U.S. Appl. No. 16/899,262.
Non-final Office Action dated Jul. 15, 2021 for U.S. Appl. No. 16/781,688.
International Search Report dated Jul. 6, 2021 for International Application No. PCT/US2020/037903.
Written Opinion dated Jul. 6, 2021 for International Application No. PCT/US2020/037903.
U.S. Appl. No. 15/929,090, filed Jan. 11, 2019.
U.S. Appl. No. 16/781,688, filed Feb. 4, 2020 entitled "Storage System and Method for Automatic Data Phasing."
"Data differencing"; Wikipedia entry; downloaded from the Internet at https://en.wikipedia.org/wiki/Data_differencing on Aug. 6, 2019; 3 pages.
"H.264/MPEG-4 AVC"; Wikipedia entry; downloaded from the Internet at https://en.wikipedia.org/wiki/H.264/MPEG-4_AVC on Aug. 6, 2019; 18 pages.
"Video compression picture types"; Wikipedia entry; downloaded from the Internet at https://en.wikipedia.org/wiki/Video_compression_picture_types on Aug. 6, 2019; 4 pages.
Final Office Action dated Mar. 17, 2022 for U.S. Appl. No. 16/781,688.
U.S. Appl. No. 16/708,091, filed Dec. 9, 2019 entitled "Storage System and Method for Video Frame Segregation to Optimize Storage."

* cited by examiner

STORAGE SYSTEM AND METHOD FOR OPTIMIZED SURVEILLANCE SEARCH

BACKGROUND

A storage system can be used to store a data stream sent to it by a host. In a surveillance or digital video recorder (DVR) environment, the data can be stored in memory in the Moving Picture Experts Group Transport Stream (MPEG-TS) format. Searching for an object or a person of interest in the stored video is a major requirement of surveillance systems. Typically, the host retrieves the entire stored video from the storage system and performs its own search to find the object or a person of interest.

DETAILED DESCRIPTION

Overview

Figure 1A:
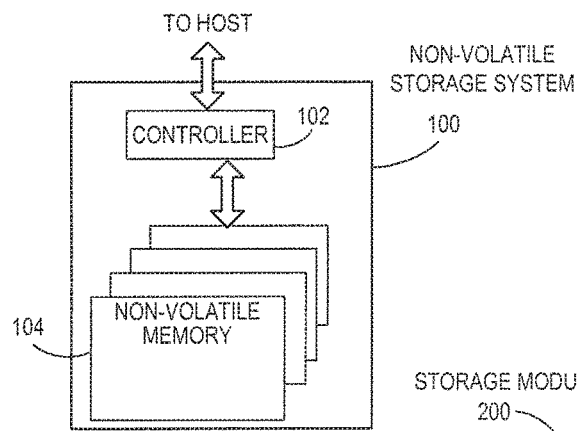
FIG. 1A is a block diagram of a non-volatile storage system of an embodiment.

By way of introduction, the below embodiments relate to a storage system and method for optimized surveillance search. In one embodiment, a storage system is provided comprising a memory and a controller. The controller is configured to: receive, from a host, an image of an object and a logical block address range of video data stored in the memory; search for the image of the object in video data in the logical block address range; and provide the host with possible hits from the search.

In some embodiments, the controller is further configured to search for the image of the object by: decoding the video data in the logical block address range; and attempting to match a subset of frames from the decoded video data with the image.

In some embodiments, the subset of frames comprises Instantaneous Decoder Refresh (IDR) frames.

In some embodiments, a distance between adjacent frames in the subset of frames is provided for by a quality of service parameter.

In some embodiments, the controller is further configured to search for the image of the object using artificial intelligence.

In some embodiments, the controller is further configured to search for the image of the object using machine learning.

In some embodiments, the controller is further configured to provide the host with possible hits from the search by providing the host with a table of hits with corresponding match percentages.

In some embodiments, the image of the object is part of a video clip of images received from the host.

In some embodiments, the memory comprises a three-dimensional memory.

In some embodiments, the storage system is configured to be integrated in the host.

In some embodiments, the storage system is configured to be removably connected with the host.

In another embodiment, a method is provided that is performed in a storage system comprising a memory. The method comprises: receiving, from a host, a request to search for an image in a logical block address range of video data stored in the memory; decoding the video data in the logical block address range; attempting to match a subset of frames from the decoded video data with the image; and providing time host with possible hits and corresponding match percentages.

In some embodiments, the subset of frames comprises Instantaneous Decoder Refresh (IDR) frames.

In some embodiments, a distance between adjacent frames in the subset of frames is provided for by a quality of service parameter.

In some embodiments, the method further comprises using artificial intelligence in attempting to match the subset of frames with the image.

In some embodiments, the method further comprises using machine learning in attempting to match the subset of frames with the image.

In another embodiment a storage system is provided comprising: a memory; means for receiving, from a host, an image of an object and a logical block address range of video data stored in the memory; means for searching for the image of the object in the logical block address range; and means for providing the host with possible hits from the search.

In some embodiments, the means for searching comprises means for: decoding the video data in the logical block address range; and attempting to match Instantaneous Decoder Refresh (IDR) frames from the decoded video data with the image.

In some embodiments, the storage system further comprises means for providing the host with possible hits from the search by providing the host with a table of hits with corresponding match percentages.

In some embodiments, the storage system further comprises means for searching for the image of the object in the logical block address range using artificial intelligence or machine learning.

Other embodiments are possible, and each of the embodiments can be used alone or together in combination. Accordingly, various embodiments will now be described with reference to the attached drawings.

Embodiments

Figure 1B:
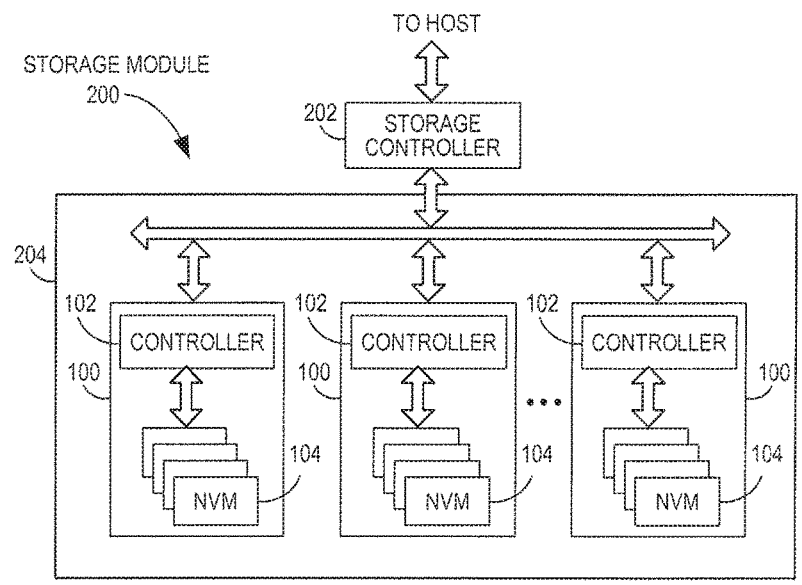
FIG. 1B is a block diagram illustrating a storage module of an embodiment.
Figure 1C:
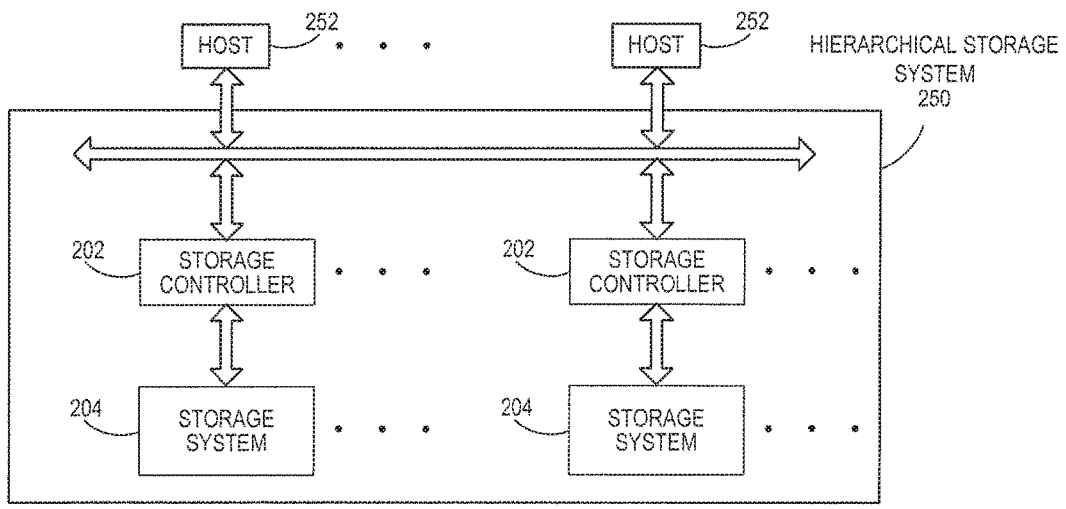
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
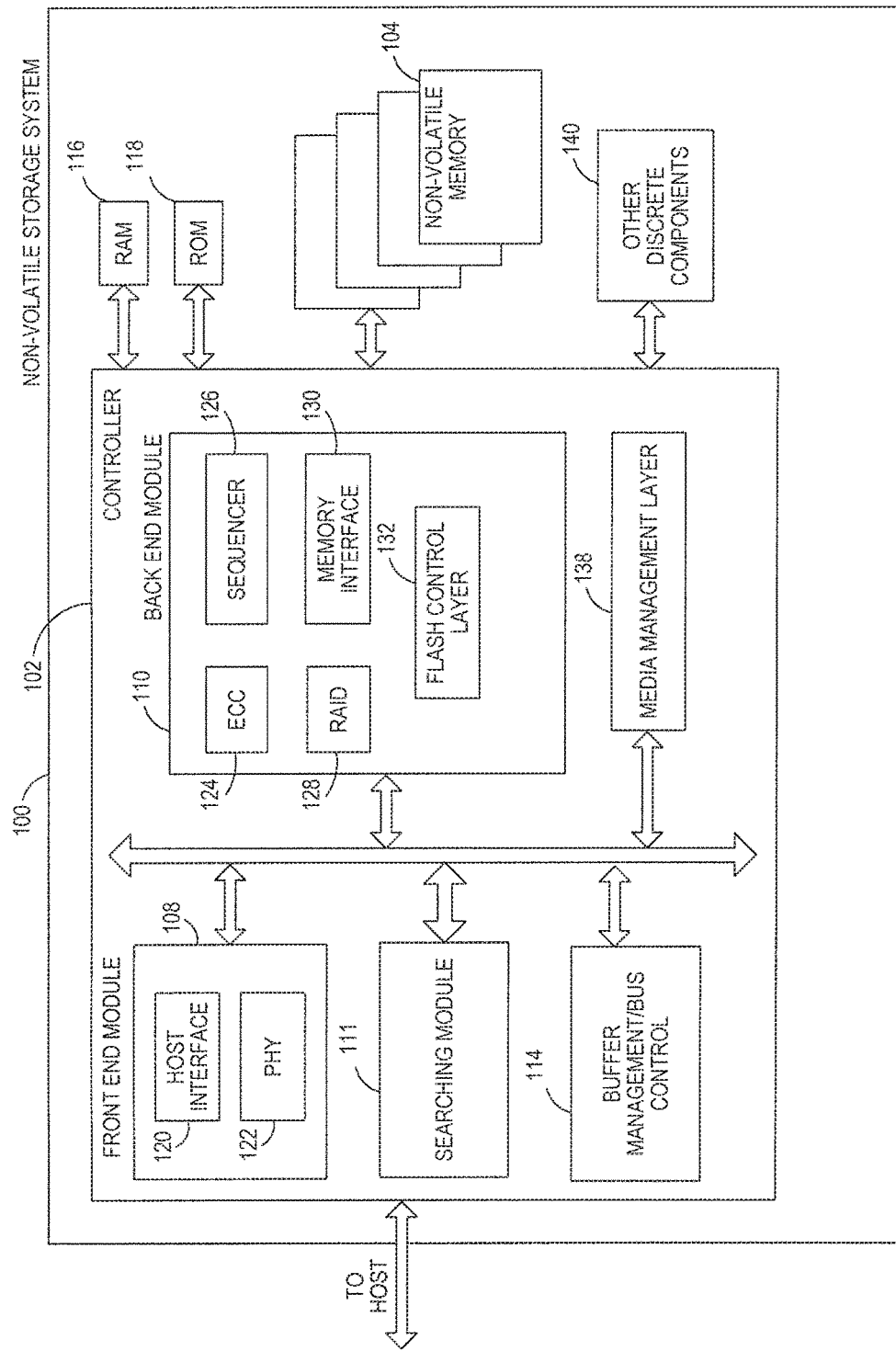
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a searching module 111, which is discussed in more detail below, and can be implemented in hardware or software/firmware to extract various video frames from a video stream. The searching module 111 can be configured to perform the algorithms and methods discussed below and shown in the attached drawings.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used, Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the FCC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
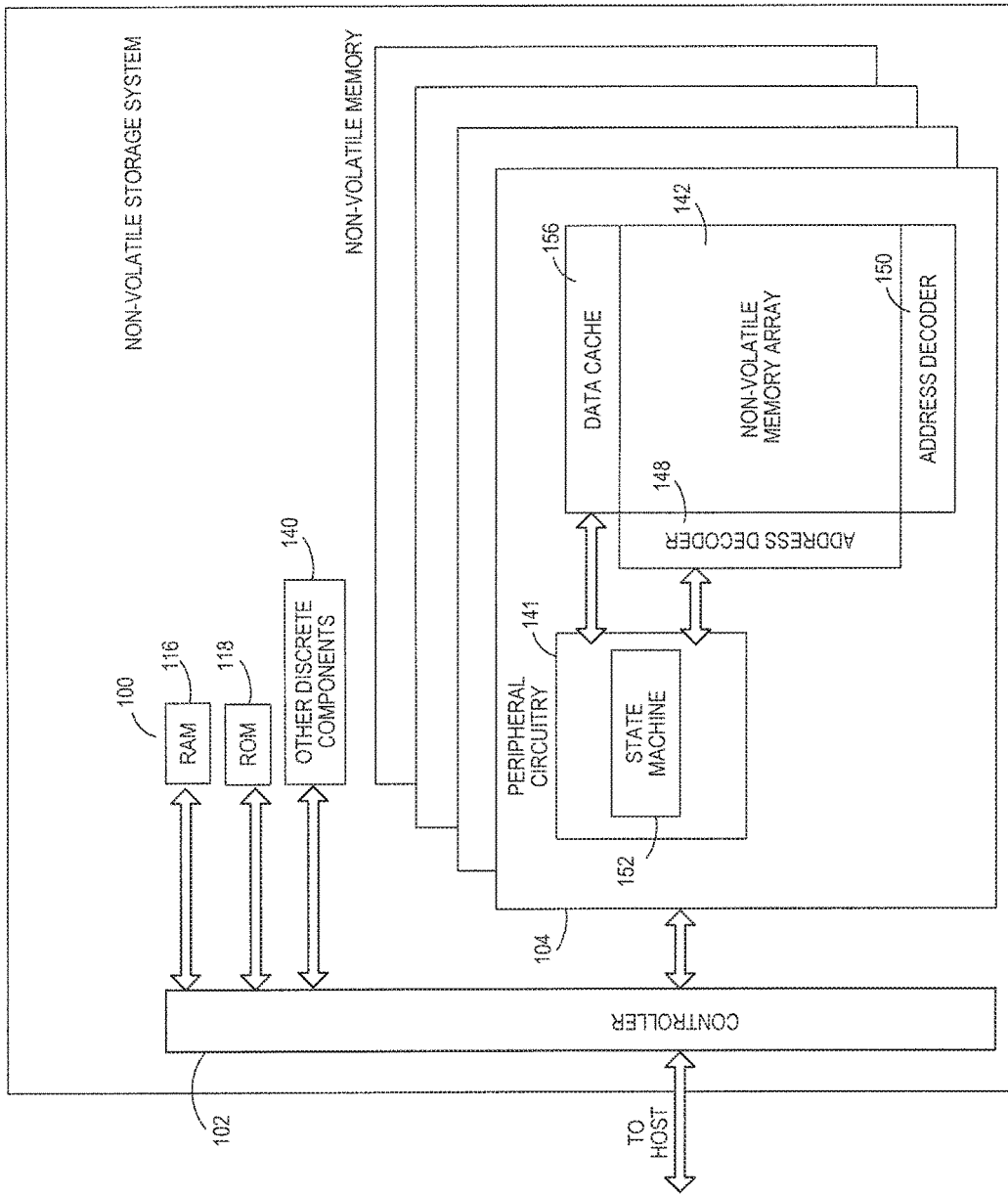
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

As mentioned above, a storage system can be used to store a data stream sent to it by a host. In a surveillance or digital video recorder (DVR) environment, the data can be stored in memory in the Moving Picture Experts Group Transport Stream (MPEG-TS) format. Searching for an object or a person of interest in the stored video is a major requirement of surveillance systems. Typically, the host retrieves the entire stored video from the storage system and performs its own search to find the object or a person of interest. This is not optimum as it is a time- and resource-consuming process.

The following embodiments can be used to optimize the search process by taking advantage of the fact that, in many cases, the host knows the logical or time range to search for to find the person or object of interest. Before turning to these embodiments for performing search operations in the storage system 100, it should be noted that, for simplicity, the term "object" will be used to refer to the person or thing that the host is searching for in the video. So, "object," as used herein, can, but does not necessarily, refer to a person.

In one embodiment, the host provides the storage system 100 with an image of an object and a logical block address range of video data stored in the memory 104, which can be a subset of the larger logical block address range of the video data. As will be discussed below, the image can be a single image or one of many images in a video clip. The storage system 100 (e.g., the controller 102 or the searching module 111) searches for the image of the object in the logical block address range and provides the host with possible hits from the search. Because it is the storage system 100 and not the host that is performing the search, these embodiments ease automation and minimize system latencies since the search algorithm runs inside the storage system 100, thereby avoiding the need to transfer large amounts of irrelevant data to the host. That is, with these embodiments, the backend storage system can perform this activity, rather than trying to retrieve the entire data set to a host processor. These embodiments may be particularly beneficial with surveillance systems networked in a city, where authorities want to search for a wanted person's image.

While these embodiments can be implemented in any suitable way, the following paragraphs provide an example implementation where the video data is stored in the memory 104 in the Moving Picture Experts Group Transport Stream (MPEG-TS) format. It should be understood that this is merely an example, and other types of formats, frame types, and storage options can be used.

In general, with video compression, different video frames are compressed using different compression algorithms. Different video frames can be classified into different picture or frame types, Three of the major picture types are intra-coded picture frames (I-frames), predicted picture frames (P-frames), and bidirectional predicted picture frames (B-frames). I-frames are the least compressible but are independent in that they can be decoded without reference to other video frames. At I-frame can be a complete image, such as a Joint Photographic Experts Group (JPEG)

image file. In contrast, a predicted picture frame (P-frame) (or delta frame) contains the changes in the image from the previous frame and requires reference to other video frames to be decompressed. However, P-frames are more compressible that I-frames. A bidirectional predicted picture frame (B-frame) contains differences between the current frame and both the preceding and following frames. Accordingly, B-frames provide the highest amount of data compression.

Further, an Instantaneous Decoder Refresh (IDR) frame is a group of I-frame slices. With an IDR frame, all pictures in a reference buffer are marked as use for reference, and all subsequently-transmitted slices are decoded without reference to any frame decoded prior to the IDR frame. No frame after the IDR frame can reference any frame before it. IDR frames are used to avoid any distortions in the video when fast-forwarding. IDR frames are particularly useful for comparison to the reference image from the host because IDR frames are independently-decodable frames on par with an image. In short, a search algorithm only has to figure out if the object in the reference image is the same as or related to the object in another image and, if so, the extent of the similarity.

Figure 3:
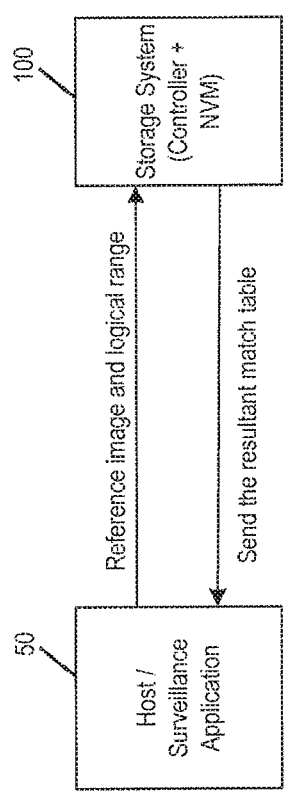
FIG. 3 is a block diagram of a host and storage system of an embodiment.

Returning to the drawings, FIG. 3 is a block diagram of one suitable implementation. As shown in FIG. 3, the host 50 sends a reference image and logical range to the storage system 100. On receiving the reference image, the storage system 100 internally decodes the stored video data within the host-provided logical range and retrieves a subset of frames (here, IDR frames) from the decoded video data. The distance between adjacent frames chosen for the matching operation can be provided for by the search's quality of service (QoS) parameter and the bandwidth of the processor 102.

The storage system 100 then attempts to match the subset of frames with the image provided by the host 50. For example, the storage system 100 can use artificial intelligence or machine-learning techniques to match the host-provided image to the objects in different video IDR frames (multiple independent images) retrieved from provided data range. Examples of image recognition techniques that can be used to perform the search include those in U.S. Pat. No. 7,847,820 and U.S. Patent Application Publication No. US2006/0190419, which are hereby incorporated by reference. With improvement in pattern-matching algorithms, the scale of quality and automation increases with searches in surveillance systems.

Next, the storage system 100 provides the host 50 with possible hits from the search and corresponding match percentages. For example, the storage system 100 can populate a table of hits with high to low matching rates, against the logical data range resulting from above steps, and send the populated table as feedback to the host 50 (e.g., to a surveillance application running on the host 50). The host 50 can then use this feedback to determine next steps, such as prioritizing the high-matching patterns for data retrieval and verification, data movement, subsequent processing, and other related decisions.

Figure 4:
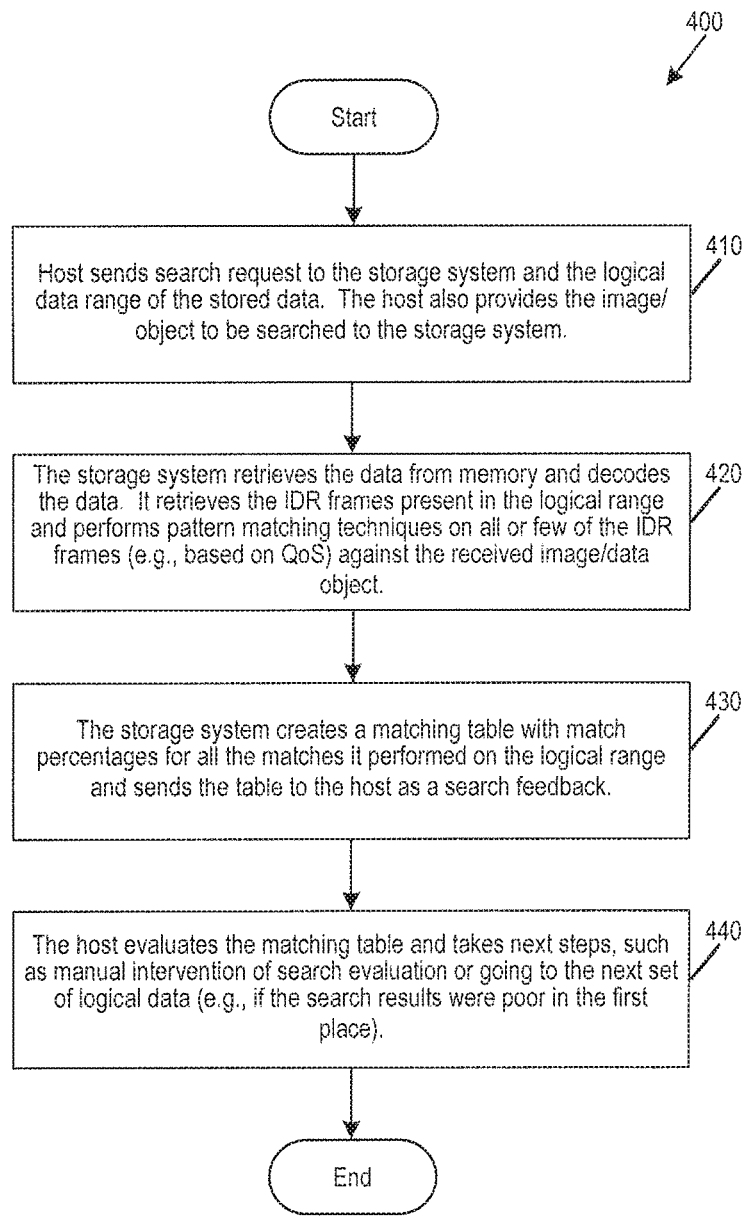
FIG. 4 is a flow chart of a method of an embodiment for optimized surveillance search.

These processes are illustrated in the flow chart 400 in FIG. 4, which illustrates the functional flow of a video search in an edge storage system. As shown in FIG. 4, the host 50 first sends a search request to the storage system 100 with the logical range of the stored data (act 410). The host 50 also provides the image/object to be searched to the storage system 100. The storage system 100 then retrieves the data from the memory 104 and decodes the data (act 420). The storage system 100 retrieves IDR frames present in the logical range and performs pattern-matching techniques on all or few of the IDR frames (e.g., based on the quality of service (QoS)) against the received image/object. The storage system 100 then creates a matching table with match percentages for all the matches it performed on the logical range and sends the table to the host 50 as search feedback (act 430). Finally, the host 50 evaluates the matching table and takes next steps, such as manual intervention of the search evaluation or going to the next set of logical data (e.g., if the search results were poor in the first place) (act 440).

There are many alternatives that can be used with these embodiments. For example, instead of sending a single reference image, the host 50 can send a video clip comprising a plurality of other images. The storage system 100 can retrieve the reference object(s) from the input (IDRs through decode). Once the object(s) is/are retrieved, the above search process can be applied as many times as the number of reference images. The resultant two-dimensional feedback is passed to the host 50 at the end of processing. This strengthens the search mechanism to account for commonalities.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
a memory; and
a controller configured to:
receive, from a host, a search request comprising an image of an object, a logical block address range of video data stored in the memory, and a quality-of-service parameter; and
in response to the receiving the search request:
retrieve the video data from the memory;
decode the video data to identify a set of Instantaneous Decoder Refresh (IDR) frames in the video data;
compare the set of IDR frames with the image of the object to identify a number of IDR frames in the set of IDR frames, wherein the number of IDR frames in the set of IDR frames is based on the quality-of-service parameter; and
provide the host with an indication of how closely each IDR frame in the set of IDR frames matches the object of interest.

2. The storage system of claim 1, wherein a distance between adjacent frames in the set of IDR frames is provided for by the quality-of-service parameter.

3. The storage system of claim 1, wherein the controller is further configured to compare the set of IDR frames with the image of the object using artificial intelligence.

4. The storage system of claim 1, wherein the controller is further configured to compare the set of IDR frames with the image of the object using machine learning.

5. The storage system of claim 1, wherein the controller is further configured to provide the indication via a table.

6. The storage system of claim 1, wherein the image of the object is part of a video clip of images received from the host.

7. The storage system of claim 1, wherein the memory comprises a three-dimensional memory.

8. The storage system of claim 1, wherein the storage system is configured to be integrated in the host.

9. The storage system of claim 1, wherein the storage system is configured to be removably connected with the host.

10. The storage system of claim 1, wherein a distance between adjacent frames in the set of IDR frames is provided for by a bandwidth of the controller.

11. A method comprising:
performing operations in a storage system comprising a memory:
receiving, from a host, a search request comprising an image of an object, a logical block address range of video data stored in the memory, and a quality-of-service parameter; and
in response to the receiving the search request:
retrieving, by a processor, the video data from the memory;
decoding, by the processor, the video data to identify a set of Instantaneous Decoder Refresh (IDR) frames in the video data;
comparing, by the processor, the set of IDR frames with the image of the object to identify a number of IDR frames in the set of IDR frames, wherein the number of IDR frames in the set of IDR frames is based on the quality-of-service parameter; and
providing, by the processor, the host with an indication of how closely each IDR frame in the set of IDR frames matches the object of interest.

12. The method of claim 11, wherein a distance between adjacent frames in the set of IDR frames is provided for by the quality-of-service parameter.

13. The method of claim 11, wherein the set of IDR frames is compared with the image of the object using artificial intelligence.

14. The method of claim 11, wherein the set of IDR frames is compared with the image of the object using machine learning.

15. The method of claim 11, wherein a distance between adjacent frames in the set of IDR frames is provided for by the quality-of-service parameter.

16. The method of claim 11, wherein a distance between adjacent frames in the set of IDR frames is provided for by a bandwidth of a controller of the storage system.

17. The method of claim 11, wherein the indication is provided via a table.

18. The method of claim 11, wherein the image of the object is part of a video clip of images received from the host.

19. The method of claim 11, further comprising receiving a data retrieval request from the host.

20. A storage system comprising:
a memory;
means for receiving, from a host, a search request comprising an image of an object, a logical block address range of video data stored in the memory, and a quality-of-service parameter; and
means for, in response to the receiving the search request;
decoding the video data to identify a set of Instantaneous Decoder Refresh (IDR) frames in the video data;
comparing the set of IDR frames with the image of the object to identify a number of IDR frames in the set of IDR frames, wherein the number of IDR frames in the set of IDR frames is based on the quality-of-service parameter; and
providing the host with an indication of how closely each IDR frame in the set of IDR frames matches the object of interest.

* * * * *